Figure 1:
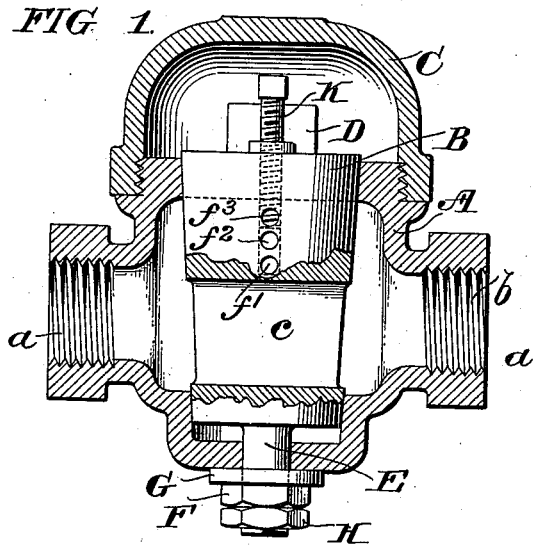

No. 653,369. Patented July 10, 1900.
W. WEBSTER.
VALVE FOR STEAM HEATING SYSTEMS.
(Application filed Nov. 3, 1899.)
(No Model.)

Witnesses:
Harry Drury
R. M. Kelly

Inventor:
Warren Webster
By his atty

UNITED STATES PATENT OFFICE.

WARREN WEBSTER, OF MERCHANTVILLE, NEW JERSEY.

VALVE FOR STEAM-HEATING SYSTEMS.

SPECIFICATION forming part of Letters Patent No. 653,369, dated July 10, 1900.

Application filed November 3, 1899. Serial No. 735,673. (No model.)

*To all whom it may concern:*

Be it known that I, WARREN WEBSTER, of Merchantville, Camden county, New Jersey, have invented an Improvement in Valves for Steam-Heating Systems, &c., of which the following is a specification.

My invention relates to valves, more especially adapted for steam-heating systems; and it consists of certain improvements which are fully set forth in the following specification and are shown in the accompanying drawings.

Much difficulty has been experienced in effectively adjusting or throttling an ordinary steam-valve where almost a complete closure is required. In a steam-heating system in which circulation is effected by means of a partial vacuum at the tail end much difficulty has been experienced in obtaining an effective circulation throughout all parts of the building, owing to the liability of the steam to be "short-circuited" by the suction. To obviate this, it is necessary to partially close or throttle certain of the valves, and a part of these valves must be throttled to such an extent as to form a very small thoroughfare, and the size of this thoroughfare must be varied in differently-located valves. With an ordinary hand-valve, such as is commonly used, this careful throttling to form a small thoroughfare cannot practically be obtained, since the ordinary valve passage-way is of such size that a very nice adjustment must be made to obtain the desired closure. It results that even when such valves are adjusted with great care they are usually too widely open to effectively control the circulation.

It is the object of my invention to provide a valve which may be easily and expeditiously adjusted to form the very small thoroughfare desired and to enable that small thoroughfare to be readily increased or diminished to the desired extent without requiring any special care or skill. In such a valve I preserve the ordinary main passage-way or full thoroughfare, which is thus available in all parts of the building when required, and the same valves may be used throughout with only the necessity of proper adjustment.

In carrying out my invention I provide the valve with a thoroughfare or main passage-way of the usual large area and in addition thereto with an independent thoroughfare of relatively-small area, so disposed that it may be opened or closed to form a thoroughfare of the desired extent when the main passage-way is closed. The small independent thoroughfare is preferably formed of a series of small independent passage-ways so arranged and controlled that one or more may be opened or closed to increase or decrease the size of the small thoroughfare to be formed. For ordinary adjustments the ordinary opening or closing of the main passage-way may be resorted to.

Figure 2:
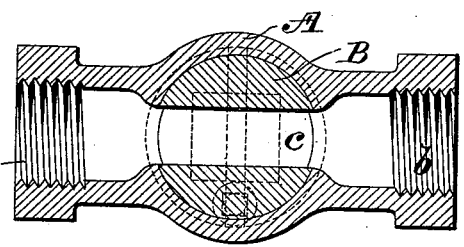
Figure 3:
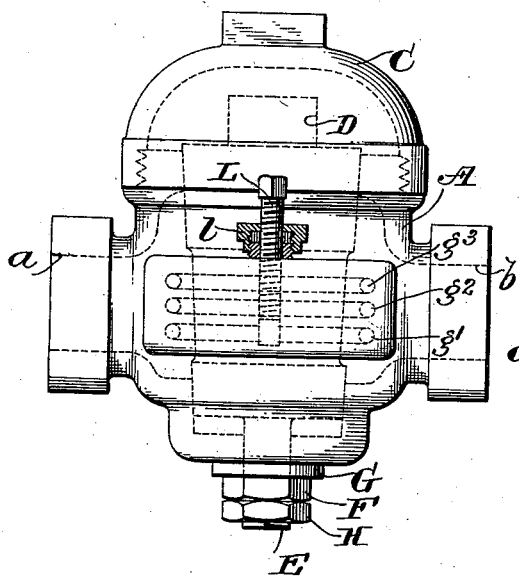
Figure 4:
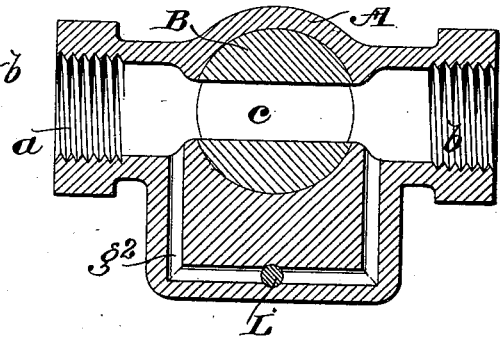

In the accompanying drawings, Figure 1 is a vertical sectional view of a valve device embodying my invention. Fig. 2 is a horizontal sectional view of the same. Fig. 3 is a side elevation of a valve device embodying the invention and illustrating a modification thereof, and Fig. 4 is a horizontal sectional view of the same.

A is the usual valve casing or body, having inlet $a$ and outlet $b$. B is the valve piece or plug, fitting within the body A and provided with a valve-passage $c$, adapted to form the main thoroughfare between the inlet and outlet sides of the valve-body. C is a bonnet or cap fitting on the body A over the top of the valve-plug B. The particular construction and arrangement of these parts is not material to my invention. By turning the plug B the valve passage-way may be opened or closed in the usual manner.

In addition to the main passage-way $c$ through the plug B, I provide a small thoroughfare so arranged that when the plug B is turned to close the main valve passage-way $c$ a by-pass or auxiliary passage-way of small area will be opened and the flow of air, steam, or water will be greatly restricted.

The plug may be adjusted or turned in any convenient manner. I have shown it in each construction provided on the top with a non-circular lug D, adapted to receive a key, which may be applied when the bonnet C is removed. In the construction shown in Figs. 1 and 2 the lower end of the valve-plug is provided with a threaded spindle E, projecting through the base of the body A and carrying a jam-nut F, by which the valve-plug is fastened in the body A and may be held tightly therein to prevent leakage. A washer G may be interposed between the nut F and the body A, and the usual lock-nut H may be employed.

In the construction shown in Figs. 1 and 2 the valve-plug B is provided with the small passage-ways $f'$ $f^2$ $f^3$, arranged in the same plane one above the other, and an adjustable pin or screw K fits a transverse bore or threadway extending through them. By adjusting the pin or screw K one or more of the passage-ways $f'$ $f^2$ $f^3$ may be opened. These passage-ways $f'$ $f^2$ $f^3$ extend transversely to the main valve passage-way $c$, so as to be in communication with the inlet and outlet when the passage-way $c$ is closed by turning of the plug. In the construction shown in Figs. 3 and 4 the small auxiliary passage-ways are formed as by-passes $g'$ $g^2$ $g^3$ in the valve-body, extending about the valve-plug B and forming a communication between the inlet and outlet. These passage-ways are controlled by an adjustable pin or screw L, fitting a bore or threadway extending through them, as in the case of the construction shown in Figs. 1 and 2. As these passage-ways $g'$ $g^2$ $g^3$ are not formed directly in the plug B, the screw L may project outside of the valve-body and bonnet and may therefore be adjusted without removing the bonnet. A suitable stuffing-box $l$ may be employed to prevent the escape of steam, vapor, or water through the screw-threadway.

No great care or accuracy of adjustment is required in regulating the screws L or K, as the restricted passage-ways positively limit the extent of thoroughfare, and it is only necessary to move the screw to the extent required to open one or more of those passage-ways, as may be desired. Such adjustment of the thoroughfare could obviously not be obtained by merely closing the passage-way $c$ to a greater or less extent, because as that passage-way is necessarily of comparatively-large size a very careful adjustment would be necessary to close the thoroughfare to the desired extent of restriction, and in practical use such nice adjustment is not possible and the valve is either closed or opened to too great an extent.

The details of construction shown may be varied without departing from the invention.

What I claim as new, and desire to secure by Letters Patent, is as follows:

1. In a valve, the combination of the valve-body, a valve-piece having a passage-way of relatively-large area forming a main thoroughfare adapted to be opened and closed by the manipulation of said valve-piece, said valve-piece being further provided with a relatively-small thoroughfare independent of the main thoroughfare so arranged with reference thereto as to remain closed while the main thoroughfare is open, and means to independently control said small auxiliary thoroughfare to open it when the main thoroughfare is closed and to increase or decrease its size, substantially as and for the purposes described.

2. In a valve, the combination of the valve-body, a valve-piece having a passage-way of relatively-large area forming a main thoroughfare, and a series of small passage-ways of relatively-small area, so arranged with reference to said main passage-way as to be open when said main passage-way is closed, and an adjustable piece to open or close one or more of said small passage-ways to control the size of the thoroughfare afforded thereby.

3. A valve device having a main thoroughfare of relatively-large area, and an auxiliary thoroughfare of relatively-small area formed of a series of small independent passage-ways, and embracing a main valve-piece to control said main thoroughfare, and an independent valve-piece adapted to open or close one or more of said small passage-ways to control the size of the small thoroughfare afforded thereby when the main thoroughfare is closed.

4. In a valve, the combination of the valve-body, the valve-piece having a main thoroughfare $c$ of relatively-large area and a series of small passage-ways arranged transversely thereto and adapted to be opened into the valve-body when said main thoroughfare is closed, and an adjustable piece K movable transversely through said small passage-ways and adapted to open or close one or more thereof to regulate the size of the thoroughfare afforded thereby.

In testimony of which invention I have hereunto set my hand.

WARREN WEBSTER.

Witnesses:
B. M. KELLY,
J. W. KENWORTHY.